United States Patent
Furumi

(10) Patent No.: US 10,503,322 B2
(45) Date of Patent: Dec. 10, 2019

(54) PROJECTOR AND METHOD OF CONTROLLING PROJECTOR

(71) Applicant: SEIKO EPSON CORPORATION, Tokyo (JP)

(72) Inventor: Yoshiyuki Furumi, Asahi-Mura (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/987,106

(22) Filed: May 23, 2018

(65) Prior Publication Data

US 2018/0341367 A1  Nov. 29, 2018

(30) Foreign Application Priority Data

May 29, 2017  (JP) ................. 2017-105185

(51) Int. Cl.
| | |
|---|---|
| *G06F 3/042* | (2006.01) |
| *G06F 3/0481* | (2013.01) |
| *H04N 5/445* | (2011.01) |
| *H04N 9/31* | (2006.01) |

(52) U.S. Cl.
CPC ........ *G06F 3/0425* (2013.01); *G06F 3/04817* (2013.01); *H04N 5/44504* (2013.01); *H04N 9/3179* (2013.01); *H04N 9/3194* (2013.01)

(58) Field of Classification Search
CPC ............. H04N 5/44504; H04N 9/3179; H04N 9/3194; G06F 3/0425
USPC ....... 348/599, 601, 719, 727, 744, 747, 756, 348/771, 333.1, 225.1, 158, 50, 49, 48, 348/47, 14.12; 353/28, 29, 30, 71, 94
See application file for complete search history.

(56) References Cited

U.S. PATENT DOCUMENTS

| | | | |
|---|---|---|---|
| 2004/0114043 A1* | 6/2004 | Belliveau | A47F 11/10 348/207.99 |
| 2005/0134684 A1* | 6/2005 | Perry | H04N 5/222 348/135 |
| 2006/0072076 A1* | 4/2006 | Smoot | G03B 15/10 353/34 |
| 2008/0074563 A1* | 3/2008 | Nishino | G09G 3/2022 348/771 |
| 2009/0128716 A1* | 5/2009 | Nagashima | G06F 3/0423 348/756 |
| 2011/0210963 A1* | 9/2011 | Lee | G02B 27/0093 345/419 |
| 2012/0098865 A1 | 4/2012 | Takano et al. | |

(Continued)

FOREIGN PATENT DOCUMENTS

| | | |
|---|---|---|
| JP | 2005-17495 A | 1/2005 |
| JP | 2012-104096 A | 5/2012 |

*Primary Examiner* — Jefferey F Harold
*Assistant Examiner* — Mustafizur Rahman
(74) *Attorney, Agent, or Firm* — Oliff PLC

(57) ABSTRACT

A projector includes a projection section adapted to project a first image and a second image on a projection surface, an imaging section adapted to image the projection surface to generate a taken image, a detection section adapted to detect an operation on the second image based on the taken image, and a processing section adapted to perform a process corresponding to the second image in response to the detection of the operation, and the processing section is prevented from performing the process during a first period starting from when a change occurs in the first image.

14 Claims, 6 Drawing Sheets

(56) References Cited

U.S. PATENT DOCUMENTS

| | | | |
|---|---|---|---|
| 2013/0128057 A1* | 5/2013 | Cho | H04N 17/04 |
| | | | 348/189 |
| 2014/0092124 A1* | 4/2014 | Van Lydegraf | G06F 3/0488 |
| | | | 345/620 |
| 2015/0110347 A1* | 4/2015 | Suzuki | G06K 9/00355 |
| | | | 382/103 |
| 2015/0244997 A1* | 8/2015 | Masuko | H04N 9/3179 |
| | | | 348/747 |
| 2015/0256803 A1* | 9/2015 | Alhazme | H04N 9/3185 |
| | | | 348/746 |
| 2015/0271457 A1* | 9/2015 | Kokojima | G06F 3/041 |
| | | | 348/744 |
| 2017/0214895 A1* | 7/2017 | Fujioka | H04N 9/3188 |
| 2017/0255814 A1* | 9/2017 | Kaehler | G06F 21/32 |
| 2018/0234639 A1* | 8/2018 | Kim | H04N 5/2621 |

* cited by examiner

PROJECTOR AND METHOD OF CONTROLLING PROJECTOR

CROSS-REFERENCE

The entire disclosure of Japanese Patent Application No. 2017-105185 filed May 29, 2017 is expressly incorporated by reference herein.

BACKGROUND

1. Technical Field

The present invention relates to a projector and a method of controlling a projector.

2. Related Art

In JP-A-2012-104096 (Document 1), there is described a projector which projects a projection image including an operation icon on a projection surface when a pointing body such as a hand is detected on the projection surface. The projector is provided with a camera for imaging the projection surface to generate a taken image, and performs a process corresponding to the operation icon when the projector detects the operation on the operation icon by the pointing body based on the taken image.

The projector described in Document 1 does not project the projection image including the operation icon until the projector detects the pointing body such as a hand. Therefore, it is difficult for the user to figure out whether or not the operation with the operation icon is available. Therefore, it becomes easier for the user to recognize that the operation with the operation icon is available if the projector projects the operation icon irrespective of the detection of the pointing body.

However, in the case in which the operation icon is projected irrespective of the detection of the pointing body, there is increased the frequency of the case in which, for example, the user him- or herself (e.g., a hand of the user) passes between the operation icon on the projection surface and the camera to thereby cause the execution of the process corresponding to the operation icon despite the intension of the user.

SUMMARY

An advantage of some aspects of the invention is to provide a technology capable of preventing the frequency of the case in which a process corresponding to an image such as an operation icon is performed despite the intension of the user from increasing.

A projector according to an aspect of the invention includes a projection section adapted to project a first image and a second image on a projection surface, an imaging section adapted to image the projection surface to generate a taken image, a detection section adapted to detect an operation on the second image based on the taken image, and a processing section adapted to perform a process corresponding to the second image in response to the detection of the operation, wherein the processing section is prevented from performing the process during a first period starting from when a change occurs in the first image.

For example, in the case in which a presentation using the first image is performed, the user often comes closer to the first image on the projection surface immediately after the first image changes in order to explain the first image having changed. On this occasion, the user passes by the front of the second image without intending to operate the second image in some cases.

According to the aspect of the invention, the process corresponding to the second image is not performed during the first period starting from when the change occurs in the first image. Therefore, it becomes possible to prevent the process corresponding to the second image from being performed despite the intension of the user even if the user comes closer to the first image on the projection surface immediately after the first image changes.

In the projector according to the aspect of the invention described above, it is desirable that the processing section prevents the projection section from projecting the second image during the first period starting from when the change occurs in the first image.

According to the aspect of the invention with this configuration, the second image is not projected during the first period starting from when the change occurs in the first image, and therefore, the operation on the second image is not detected. Therefore, it becomes possible to prevent, for example, the process corresponding to the second image from being performed despite the intension of the user immediately after the first image changes.

Further, in the case in which the second image is projected during the first period starting from when the change occurs in the first image, since the process corresponding to the second image is not performed even if the user operates the second image, there arises a possibility that the user is misled into thinking that the projector is at fault.

According to the aspect of the invention with the configuration described above, since the second image is not projected during the first period starting from when the change occurs in the first image, it becomes possible to reduce the possibility that the user is misled into thinking that the projector is at fault.

In the projector according to the aspect of the invention described above, it is desirable to further include a change section adapted to change the first period in accordance with change information related to a change of the first period.

According to the aspect of the invention with this configuration, it becomes possible to arbitrarily change the first period.

In the projector according to the aspect of the invention described above, it is desirable that the imaging section is prevented from generating the taken image during the first period starting from when the change occurs in the first image.

According to the aspect of the invention with this configuration, the taken image is not generated during the first period starting from when the change occurs in the first image, and therefore, the operation on the second image is not detected. Therefore, it becomes possible to prevent, for example, the process corresponding to the second image from being performed despite the intension of the user immediately after the first image changes.

In the projector according to the aspect of the invention described above, it is desirable that the detection section is prevented from detecting the operation during the first period starting from when the change occurs in the first image.

According to the aspect of the invention with this configuration, the operation on the second image is not detected during the first period starting from when the change occurs in the first image. Therefore, it becomes possible to prevent, for example, the process corresponding to the second image from being performed despite the intension of the user immediately after the first image changes.

A method of controlling a projector according to an aspect of the invention is a method of controlling a projector adapted to project an image on a projection surface, including the steps of projecting a first image and a second image on the projection surface, imaging the projection surface to generate a taken image, detecting an operation on the second image based on the taken image, and performing a process corresponding to the second image in response to the detection of the operation, wherein in the performing process, the process is prevented from being performed during a first period starting from when a change occurs in the first image.

According to the aspect of the invention, the process corresponding to the second image is not performed during the first period starting from when the change occurs in the first image. Therefore, it becomes possible to prevent the process corresponding to the second image from being performed despite the intension of the user even if the user comes closer to the first image on the projection surface immediately after the first image changes.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
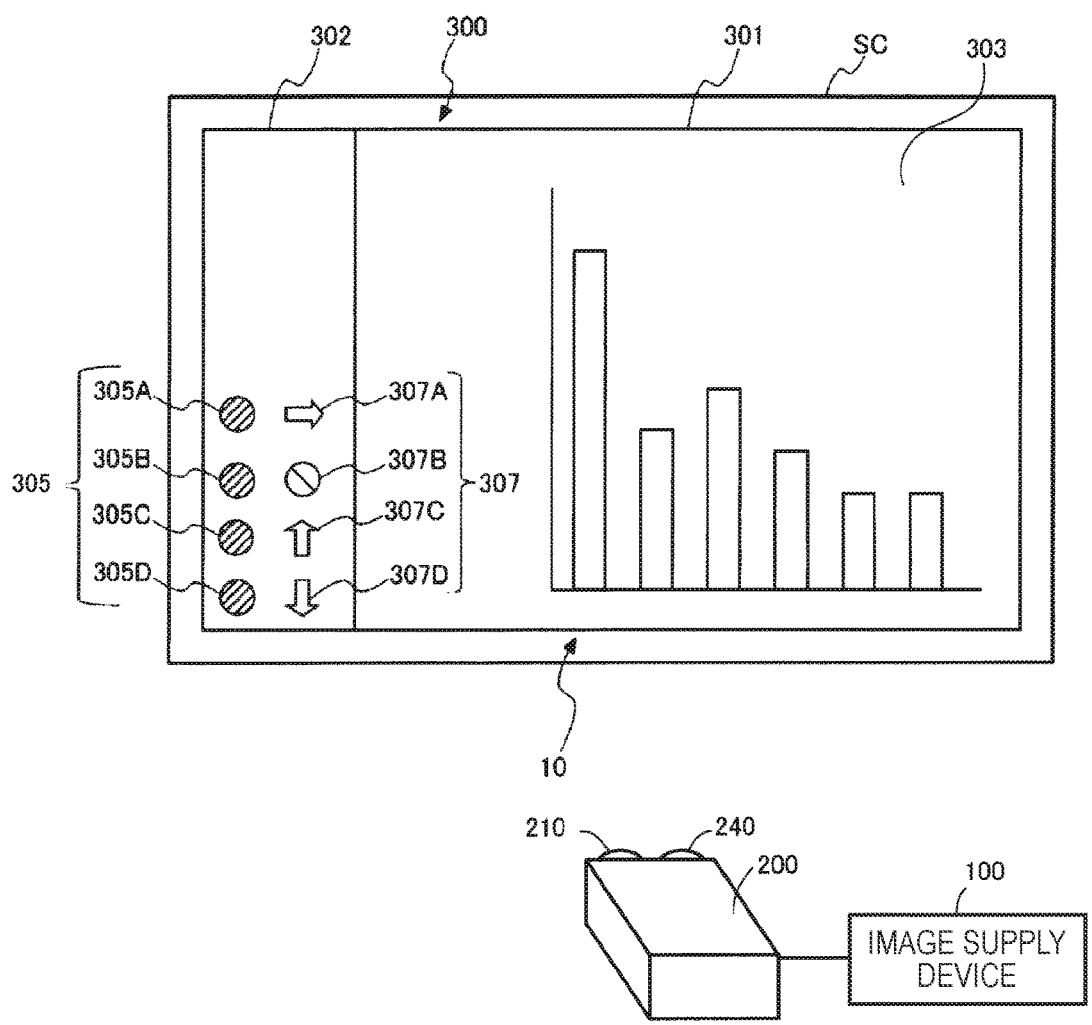
FIG. 1 is a diagram showing a projector according to a first embodiment of the invention.

Hereinafter, an embodiment of the invention will be described with reference to the accompanying drawings. It should be noted that in the drawings, the size and the scale of each of the constituents are arbitrarily different from actual ones. Further, the embodiment described hereinafter is a preferred specific example of the invention. Therefore, the present embodiment is provided with a variety of technically preferable limitations. However, the scope or the spirit of the invention is not limited to the embodiment unless there is any particular description of limiting the invention in the following description.

First Embodiment

FIG. 1 is a diagram showing a projector 200 according to the first embodiment.

The projector 200 projects a projection image 300 from a projection section 210 in a projection area 10 of a screen SC. The screen SC is an example of a projection surface. The projection surface is not limited to the screen SC, but can be a uniform plane such as a wall surface, a ceiling surface, a floor surface, or a whiteboard, or can also be a flat surface such as a wall of a building.

The projection image 300 has an image display area 301 and an operation detection area 302.

In the image display area 301, there is displayed a first image 303 corresponding to image information supplied from an image supply device 100. The first image 303 can also be an image corresponding to image information (image data) recorded in the projector 200. In FIG. 1, a bar chart is shown as an example of the first image 303. The first image 303 is not limited to the bar chart, but can arbitrarily be changed.

In the operation detection area 302, there are displayed operation detection markers 305 to be operated by the user, and icons 307 corresponding respectively to the operation detection markers 305. The icons 307 are each an image representing a design, a picture, a symbol, a character, or the like indicating a process (e.g., a page-up process or a page-down process of the first image 303) corresponding to the operation detection marker 305 to which the icon 307 corresponds. The operation detection markers 305 are each an example of the second image. The operation detection markers 305 each function as an operation detecting image. In the present embodiment, a marker which is white and has a circular shape is used as the operation detection marker 305.

In FIG. 1, four operation detection markers 305, namely operation detection markers 305A, 305B, 305C and 305D, are arranged vertically, and four icons, namely icons 307A, 307B, 307C and 307D, are arranged vertically. The operation detection markers 305A, 305B, 305C and 305D and the icons 307A, 307B, 307C and 307D correspond one-to-one to each other. It should be noted that the number of the operation detection markers 305 and the number of the icons 307 are not limited to 4, but can arbitrarily be changed. Further, the arrangement direction of the operation detection markers 305 and the arrangement direction of the icons 307 can arbitrarily be changed.

The operation detection marker 305A is made to correspond to a process of moving the operation detection area 302 from the left side of the image display area 301 to the right side thereof. The operation detection marker 305B is made to correspond to a process of stopping the display of the operation detection marker 305 and the icon 307. The operation detection marker 305C is made to correspond to a process of performing the page-up of the first image 303. The operation detection marker 305D is made to correspond to a process of performing the page-down of the first image 303.

The projector 200 images the screen SC with an imaging section 240 to generate a taken image. The projector 200 detects an operation on the operation detection marker 305, for example, an operation of the user on the operation detection marker 305 based on the taken image.

When the projector 200 detects an operation on the operation detection marker 305, the projector 200 performs the process corresponding to the operation detection marker 305 thus operated. For example, in the case in which the operation detection marker 305C has been operated, the projector 200 transmits an instruction for performing the page-up of the first image 303 to the image supply device 100 to perform the page-up process of the first image 303.

Further, the projector 200 does not perform the processes corresponding respectively to the operation detection markers 305 during a first period starting from when a change occurs in the first image 303. For example, as shown in FIG. 2, in the case in which a line chart 303a is added in the first image 303, the projector 200 does not perform the processes corresponding respectively to the operation detection markers 305 during the first period starting from the time point at which the line chart 303a is added.

Therefore, it becomes possible to prevent the processes corresponding respectively to the operation detection markers 305 from being performed despite the intension of the user even if, for example, the user comes closer to the first image 303 on the screen SC and passes by the front of the operation detection markers 305 without intending to operate the operation detection markers 305 immediately after the first image 303 changes.

Figure 2:
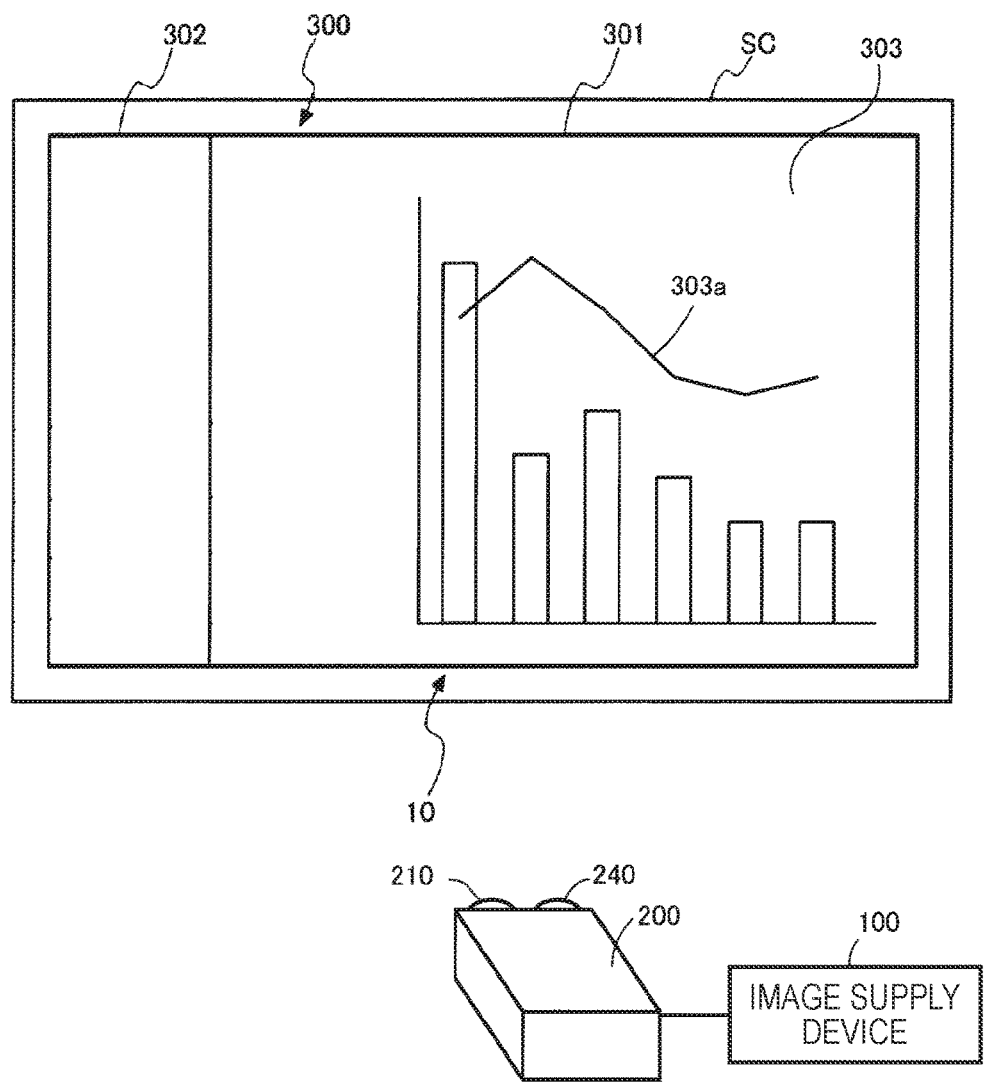
FIG. 2 is a diagram showing the projector according to the first embodiment.

It should be noted that it is also possible for the projector 200 to stop the projection of the operation detection markers 305 as shown in FIG. 2 during the first period starting from the time point at which the line chart 303a is added.

Figure 3:
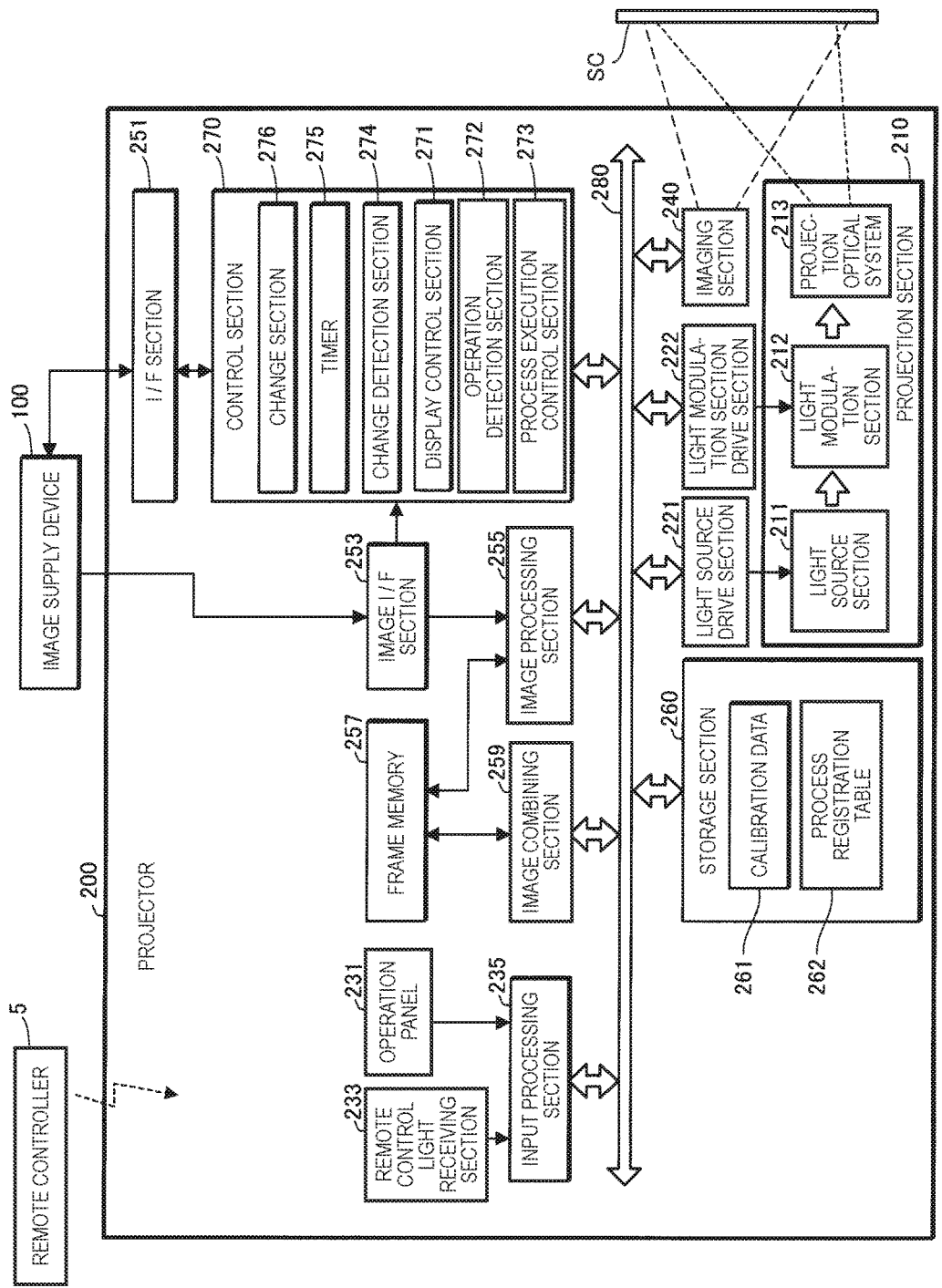
FIG. 3 is a diagram showing an example of the projector.

FIG. 3 is a diagram showing an example of the projector 200.

The projector 200 is provided with an interface section (hereinafter referred to as an "I/F section") 251, and an image interface section (hereinafter referred to as an "image I/F section") 253. The I/F section 251 and the image I/F section 253 are each provided with a connecter for wired connection, and are each provided with an interface circuit compatible with this connector. The I/F section 251 and the image I/F section 253 each can also be provided with a wireless communication interface.

The I/F section 251 is an interface for transmitting and receiving a variety of types of data such as control data to and from the image supply device 100. The image I/F section 253 is an interface for receiving the image information transmitted from the image supply device 100. The image I/F section 253 demodulates the image information to extract image data, and then outputs the image data thus extracted to an image processing section 255 and a control section 270. The image information is still image information, and the image data is still image data.

The projection section 210 projects the first image 303 and the operation detection markers 305 on the screen SC. In the present embodiment, the projection section 210 further projects the icons 307 on the screen SC (see FIG. 1).

The projection section 210 is provided with a light source section 211, a light modulation section 212, and a projection optical system 213.

The light source section 211 is provided with a light source formed of a xenon lamp, a super-high pressure mercury lamp, alight emitting diode (LED), a laser source, or the like. The light source section 211 is driven by a light source drive section 221. The light source drive section 221 is controlled by the control section 270 via an internal bus 280 to put on and off the light source of the light source section 211.

The light source section 211 can also be provided with a reflector and an auxiliary reflector for guiding the light emitted by the light source to the light modulation section 212. Further, the light source section 211 can also be provided with a lens group for improving the optical characteristics of the projection light, a polarization plate, a dimming element for reducing the light intensity of the light emitted by the light source on a path leading to the light modulation section 212, and so on (all not shown).

The light modulation section 212 is provided with three liquid crystal panels corresponding respectively to three primary colors of RGB. The light modulation section 212 is driven by alight modulation section drive section 222. To the light modulation section drive section 222, there is input superimposed image data corresponding to the respective primary colors of R, G, and B from an image combining section 259 via the internal bus 280. The superimposed image data will be described later. The light modulation section drive section 222 generates a data signal suitable for the operation of the liquid crystal panels of the light modulation section 212 from the superimposed image data. The light modulation section drive section 222 applies a voltage to each pixel of each of the liquid crystal panels based on the data signal to draw an image on each of the liquid crystal panels.

The light emitted by the light source section 211 is separated into colored light beams of three colors of RGB by a light separation section not shown. The colored light beams of RGB respectively enter the corresponding liquid crystal panels (the light modulation section 212). The three liquid crystal panels of the light modulation section 212 are each a transmissive liquid crystal panel, and each modulate the light beam transmitted through the liquid crystal panel to generate an image light beam. The image light beams having been generated by the respective liquid crystal panels are combined by a combining optical system (not shown) such as a cross dichroic prism, and turn to the projection image (projection image light). The projection image is emitted to the projection optical system 213.

The projection optical system 213 is provided with a lens group for projecting the projection image toward the screen SC to form the image on the screen SC. The projection optical system 213 can also be provided with at least one of a zoom mechanism for expanding or contracting the image (the projection image) to be projected on the screen SC, and a focus adjustment mechanism for performing an adjustment of the focus.

The projector 200 is provided with an operation panel 231, a remote controller 5, a remote control light receiving section 233, and an input processing section 235. The operation panel 231 and the remote control light receiving section 233 are connected to the input processing section 235. The input processing section 235 is connected to the internal bus 280.

The operation panel 231 is provided with a variety of operation keys for operating the projector 200. For example, the operation panel 231 is provided with a power supply key for instructing power-ON or power-OFF of the projector 200, and a menu key for performing a variety of settings. When the operation key of the operation panel 231 is operated, the input processing section 235 outputs the operation signal corresponding to the operation key thus operated to the control section 270.

The remote controller 5 is provided with a variety of types of buttons, and transmits an infrared signal in response to the operation of these buttons. The remote control light receiving section 233 receives the light of the infrared signal transmitted from the remote controller 5, and then outputs a signal corresponding to the infrared signal thus received to the input processing section 235. The input processing section 235 decodes the signal received from the remote control light receiving section 233 to generate an operation signal representing the operation content in the remote controller 5, and then outputs the operation signal to the control section 270.

The imaging section 240 images the screen SC to generate the taken image. The imaging section 240 is provided with an imaging element such as a CCD (charge coupled device) or a CMOS (complementary metal oxide semiconductor), and images the screen SC with visible light.

The imaging range of the imaging section 240 covers a range (the projection area 10) in which the projection optical system 213 projects the projection image 300 on the screen Sc. The imaging section 240 stores taken image data representing the taken image to a storage section 260.

The projector 200 is provided with an image processing system. The image processing system is provided with the control section 270, the image processing section 255, a frame memory 257, the image combining section 259, and the storage section 260. The control section 270 integrally controls the whole of the projector 200. The control section 270, the image processing section 255, the image combining section 259, and the storage section 260 are connected to each other with the internal bus 280 so as to be able to communicate data with each other.

The image processing section 255 develops the image data (the image data corresponding to the first image 303) input from the image I/F section 253 in the frame memory 257, and then processes the image data using the frame memory 257. The process performed by the image processing section 255 includes, for example, a shape correction process, a digital zoom process, a color correction process, or a luminance correction process. As an example of the shape correction process, there can be cited, for example, a resolution conversion process, a resizing process, or a distortion correction process.

The image processing section 255 performs the process designated by the control section 270 on the image data, and performs the process on the image data using a parameter input from the control section 270 as needed. It is also possible for the image processing section 255 to perform two or more processes out of the plurality of processes described above in combination with each other. The image processing section 255 outputs the image data, on which the process has been performed, to the image combining section 259.

The image combining section 259 develops the image data (the image data of the first image 303) input from the image processing section 255 in the frame memory 257. Further, the image combining section 259 receives drawing data (OSD data) from the control section 270, and then superimposes the drawing data on the image data developed in the frame memory 257 in accordance with the control by the control section 270. The drawing data is image data indicating the operation detection markers 305 and the icons 307. The image combining section 259 retrieves data (hereinafter referred to as "superimposed image data") obtained by superimposing the drawing data on the image data from the frame memory 257, and then outputs the superimposed image data to the control section 270 and the light modulation section drive section 222.

The storage section 260 is a computer-readable recording medium. The storage section 260 is, for example, a flash memory, a hard disk drive, a DRAM (dynamic RAM), a CD (compact disc), a DVD (digital versatile disc), or a BD (Blu-ray (registered trademark) disc). The storage section 260 stores the control program to be executed by the control section 270, and a variety of types of data (e.g., a parameter). The storage section 260 also stores the taken image data generated by the imaging section 240.

The storage section 260 also stores calibration data 261. The calibration data 261 is data for making the location on the liquid crystal panel and the location on the taken image of the light modulation section 212 correspond to each other. The calibration data 261 is generated by the projector 200 performing a known calibration process.

The storage section 260 also stores a process registration table 262.

In the process registration table 262, information (marker identification information) for identifying the operation detection markers 305 and information (processing information) representing the process to be performed by the projector 200 in the case in which the operation detection marker 305 is selected are stored so as to correspond to each other.

The marker identification information is information (e.g., a number) individually assigned to each of the operation detection markers 305 in order to identify each of the operation detection markers 305. It should be noted that the process registration table 262 can be generated by the control program instead of being stored in the storage section 260.

The control section 270 is a computer such as a central processing unit (CPU). The control section 270 can also be formed of one processor, or a plurality of processors. The control section 270 retrieves and then executes a control program stored in the storage section 260 to thereby realize a display control section 271, an operation detection section 272, a process execution control section 273, a change detection section 274, a timer 275, and a change section 276. It should be noted that the display control section 271, the operation detection section 272, the process execution control section 273, the change detection section 274, the timer 275, and the change section 276 can also be realized by the one processor, or the plurality of processors constituting the control section 270. Further, the input processing section 235, the image processing section 255, and the image combining section 259 can also be realized by the one processor, or the plurality of processors.

The display control section 271 controls each section of the projector 200 in order to display the projection image on the screen SC.

Specifically, the display control section 271 makes the image processing section 255 process the image data output by the image I/F section 253. Further, the display control section 271 makes the image combining section 259 perform a process of superimposing the drawing data on the image data to generate the superimposed image data. Further, the display control section 271 controls the light modulation section drive section 222 to make the liquid crystal panels of the light modulation section 212 draw the image corresponding to the superimposed image data. Further, the display control section 271 controls the light source drive section 221 to light the light source of the light source section 211 and control the luminance of the light source. Thus, the projection image 300 corresponding to the superimposed image data is projected on the screen SC.

The operation detection section 272 is an example of the detection section. The operation detection section 272 detects an operation on the operation detection markers 305 based on the taken image generated by the imaging section 240.

In the present embodiment, the operation detection section 272 detects an operation (hereinafter referred to as a "selection operation") of selecting one of the operation detection markers 305 as the operation on the operation detection markers 305. The selection operation is an operation of locating, for example, a hand of the user at the position of the operation detection marker 305. When the hand of the user is located at the position of the operation detection marker 305, the luminance at the position of the operation detection marker 305 changes in the taken image. The operation detection section 272 detects the selection operation based on the change in luminance at the position of the operation detection marker 305.

Specifically, the operation detection section 272 identifies the position of the operation detection marker 305 in the taken image based on the position of the operation detection marker 305 in the liquid crystal panel of the light modulation section 212 and the calibration data 261. Here, the operation detection section 272 identifies the position of the operation detection marker 305 in the liquid crystal panel of the light modulation section 212 based on the superimposed image data. Then, the operation detection section 272 detects the selection operation based on the change in luminance at the position of the operation detection marker 305 in the taken image.

The process execution control section 273 is an example of the processing section. The process execution control section 273 makes the projector 200 perform the process made to correspond to the operation detection marker 305 on which the operation detected by the operation detection section 272 has been performed. For example, in the case in which the operation detection marker 305D has been operated, the process execution control section 273 firstly refers to the process registration table 262 to identify the process (an instruction of performing the page-down of the first image 303) corresponding to the operation detection marker 305D. Subsequently, the process execution control section 273 transmits an instruction for performing the page-down of the first image 303 to the image supply device 100 to perform the page-down process of the first image 303.

The change detection section 274 detects the change in the first image 303 based on the image data (the image data corresponding to the first image 303) received from the image I/F section 253. For example, in the case in which the first image 303 has changed from the configuration shown in FIG. 1 to the configuration shown in FIG. 2 (the case in which the line chart 303a has been added), the change detection section 274 detects the change in the first image 303.

When the change detection section 274 has detected the change in the first image 303, the process execution control section 273 starts the timer 275. Then, the process execution control section 273 does not perform the processes made to correspond to the operation detection markers 305 from when the change detection section 274 has detected the change in the first image 303 to when the timer 275 completes measurement of the first period (e.g., 5 seconds).

Further, the process execution control section 273 prevents the projection section 210 from projecting the operation detection markers 305 from when the change detection section 274 has detected the change in the first image 303 to when the timer 275 completes the measurement of the first period.

The first period is not limited to 5 seconds, but can arbitrarily be changed. First period information representing the first period is stored in the storage section 260. The process execution control section 273 identifies the first period using the first period information stored in the storage section 260.

In the case in which the operation signal received from the input processing section 235 is change information related to the change in the first period, the change section 276 updates the first period information in accordance with the change information to thereby change the first period. For example, in the case in which the operation signal is the change information for increasing the first period by 1 second, the change section 276 changes the first period information so that the first period represented by the first period information increases as much as 1 second. Therefore, it is possible for the user to control the first period by operating the operation panel 231 or the remote controller 5. It should be noted that the change information is not limited to the information for increasing the first period by 1 second, but can arbitrarily be changed.

Then, the operation will be described.

Figure 4:
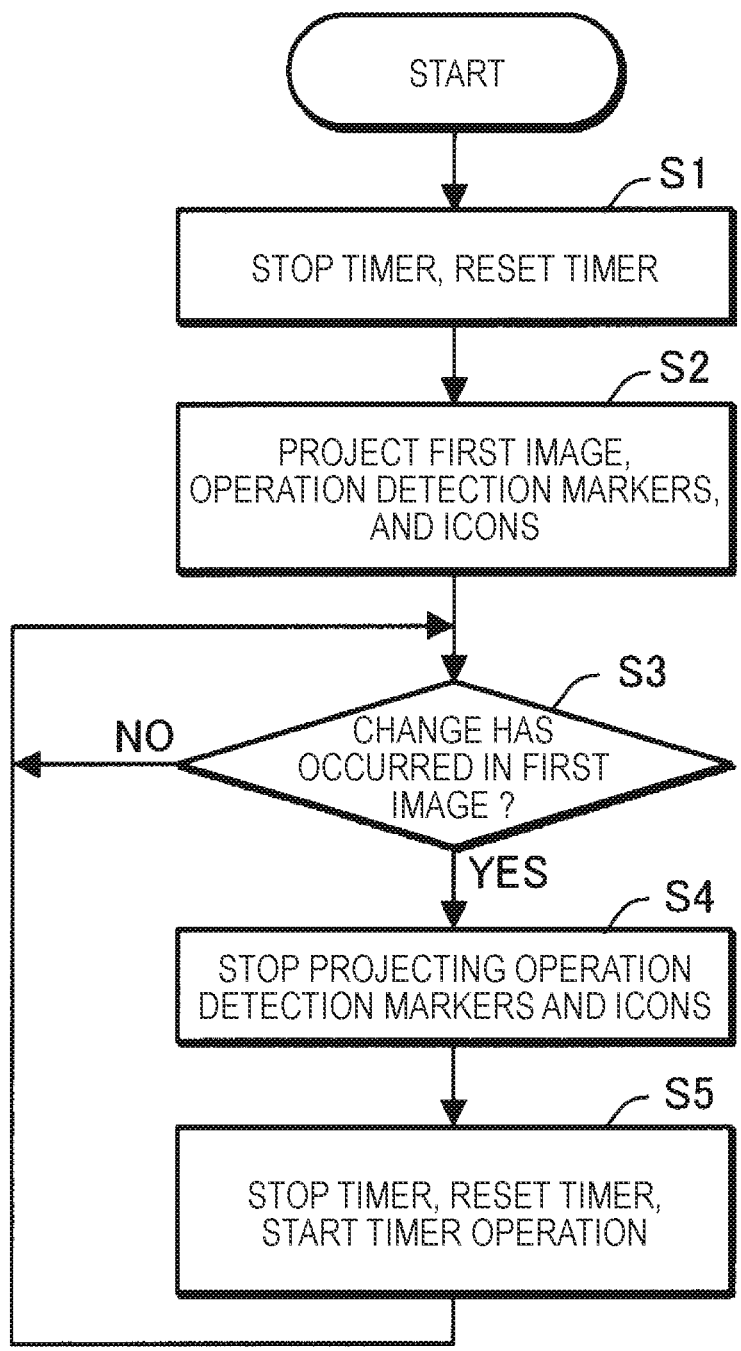
FIG. 4 is a flowchart for explaining an operation of the projector.

FIG. 4 is a flowchart for explaining the operation of the projector 200.

When the power supply key of the operation panel 231 is operated to set the power of the projector 200 ON, the process execution control section 273 stops the timer 275 for initializing the timer 275, and then resets the timer 275 (step S1). Here, in the case in which the timer 275 has already stopped, the stop process of the timer 275 in the step S1 becomes unnecessary.

Subsequently, the display control section 271 makes the image processing section 255 process the image data corresponding to the first image 303, and further, outputs the drawing data representing the operation detection markers 305 and the icons 307 to the image combining section 259. Subsequently, the display control section 271 makes the image combining section 259 perform the process of superimposing the drawing data on the image data, on which the process has been performed in the image processing section 255, to generate the superimposed image data.

When the image combining section 259 generates the superimposed image data, the image combining section 259 outputs the superimposed image data to the light modulation section drive section 222 and the control section 270, and the light modulation section drive section 222 outputs a data signal corresponding to the superimposed image data to the projection section 210. The projection section 210 projects the projection image 300 (the image including the first image 303, the operation detection markers 305, and the icons 307) corresponding to the data signal on the screen SC (step S2). It should be noted that the superimposed image data output to the control section 270 is used for the operation detection section 272 to identify the position of the operation detection marker 305 in the liquid crystal panel of the light modulation section 212.

Subsequently, the change detection section 274 waits (NO in the step S3) until the change in the first image 303 is detected based on the image data (the image data corresponding to the first image 303) received from the image I/F section 253. During this period, when the operation detection section 272 has detected the selection operation in a situation in which the timer 275 does not operate, the process execution control section 273 performs the process corresponding to the operation detection marker 305 on which the operation detected by the operation detection section 272 has been performed.

If the change detection section 274 detects the change in the first image 303 (YES in the step S3), the process execution control section 273 starts stopping the execution of the process corresponding to the operation detection marker 305. Subsequently, the process execution control section 273 outputs an output stop instruction for stopping the output of the drawing data to the image combining section 259 to the display control section 271.

When the display control section 271 receives the output stop instruction, the display control section 271 stops the output of the drawing data to the image combining section 259. Therefore, the image combining section 259 generates the image data corresponding to the projection image 300 showing the first image 303 in the image display area 301, and showing neither the operation detection markers 305 nor the icons 307 in the operation detection area 302. Therefore, the projection section 210 projects the projection image 300 (see FIG. 3) having the first image 303, and having neither the operation detection marker 305 nor the icons 307 on the screen SC (step S4).

If the projection of the operation detection markers 305 stops, the operation detection markers 305 stop appearing in the taken image. Therefore, during the period in which the operation detection markers 305 are not shown in the taken image, it becomes impossible for the operation detection section 272 to detect the selection operation based on the taken image, and thus, the process execution control section 273 stops performing the processes corresponding to the operation detection markers 305.

It should be noted that although the luminance at the position of the operation detection markers 305 in the taken image changes when the projection of the operation detection markers 305 stops, the process execution control section 273 starts stopping the execution of the processes corresponding to the operation detection markers 305 before the projection of the operation detection markers 305 stops. Therefore, it is possible to prevent the process execution control section 273 from performing the process made to correspond to the operation detection marker 305 when the projection of the operation detection markers 305 stops.

Subsequently, the process execution control section 273 stops the timer 275, then resets the timer 275, and subsequently starts the operation of the timer 275 (step S5). It should be noted that in the case in which the timer 275 has stopped at the start point of the step S5, the stop process of the timer 275 in the step S5 becomes unnecessary. Hereinafter, the operation of the timer 275 starting in the step S5 is also referred to as a "timer process."

Figure 5:
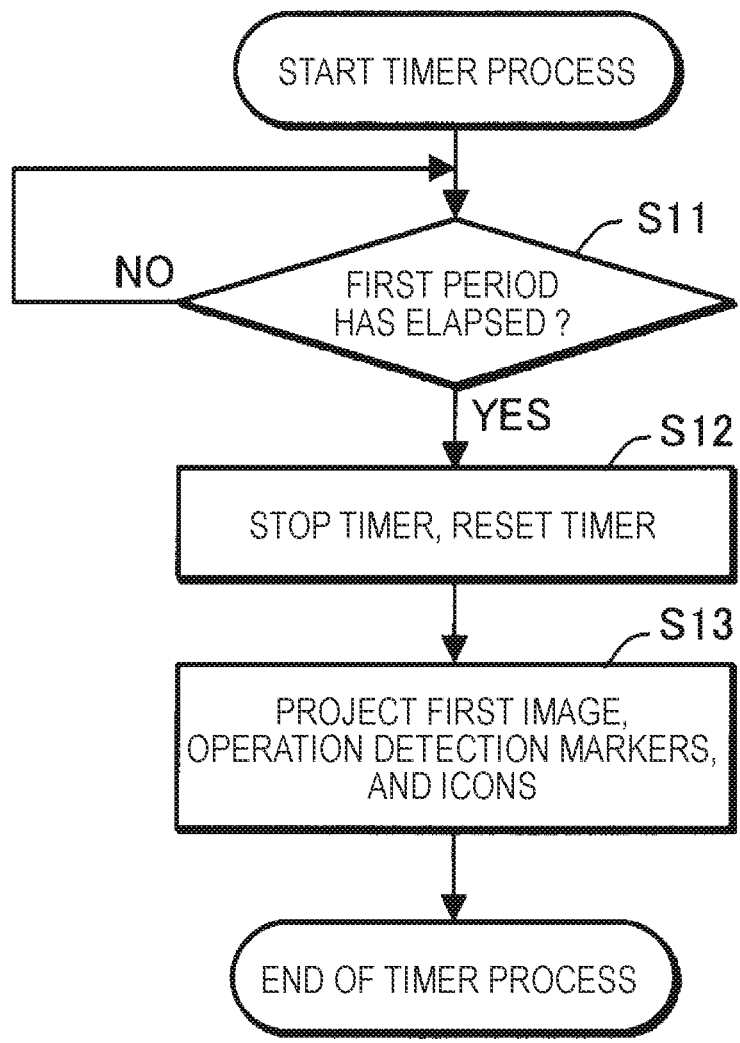
FIG. 5 is a flowchart for explaining a timer process.

FIG. 5 is a flowchart for explaining the timer process. The timer process shown in FIG. 5 is performed in parallel to the operation shown in FIG. 4.

The process execution control section 273 waits (NO in the step S11) until the measurement time of the timer 275 reaches the first period. If the measurement time of the timer 275 has reached the first period (YES in the step S11), the process execution control section 273 stops the timer 275, and then resets the timer 275 (step S12).

Subsequently, the process execution control section 273 cancels the stop of the execution of the processes made to correspond to the operation detection markers 305, and further outputs an output start instruction for starting the output of the drawing data to the image combining section 259 to the display control section 271. When the display control section 271 receives the output start instruction, the display control section 271 starts the output of the drawing data to the image combining section 259. Therefore, the image combining section 259 outputs the superimposed image data to the light modulation section drive section 222 and the control section 270, and the light modulation section drive section 222 outputs a data signal corresponding to the superimposed image data to the projection section 210. Therefore, the projection section 210 projects the projection image 300 (the image including the first image 303, the operation detection markers 305, and the icons 307) corresponding to the data signal on the screen SC (step S13).

Figure 6:
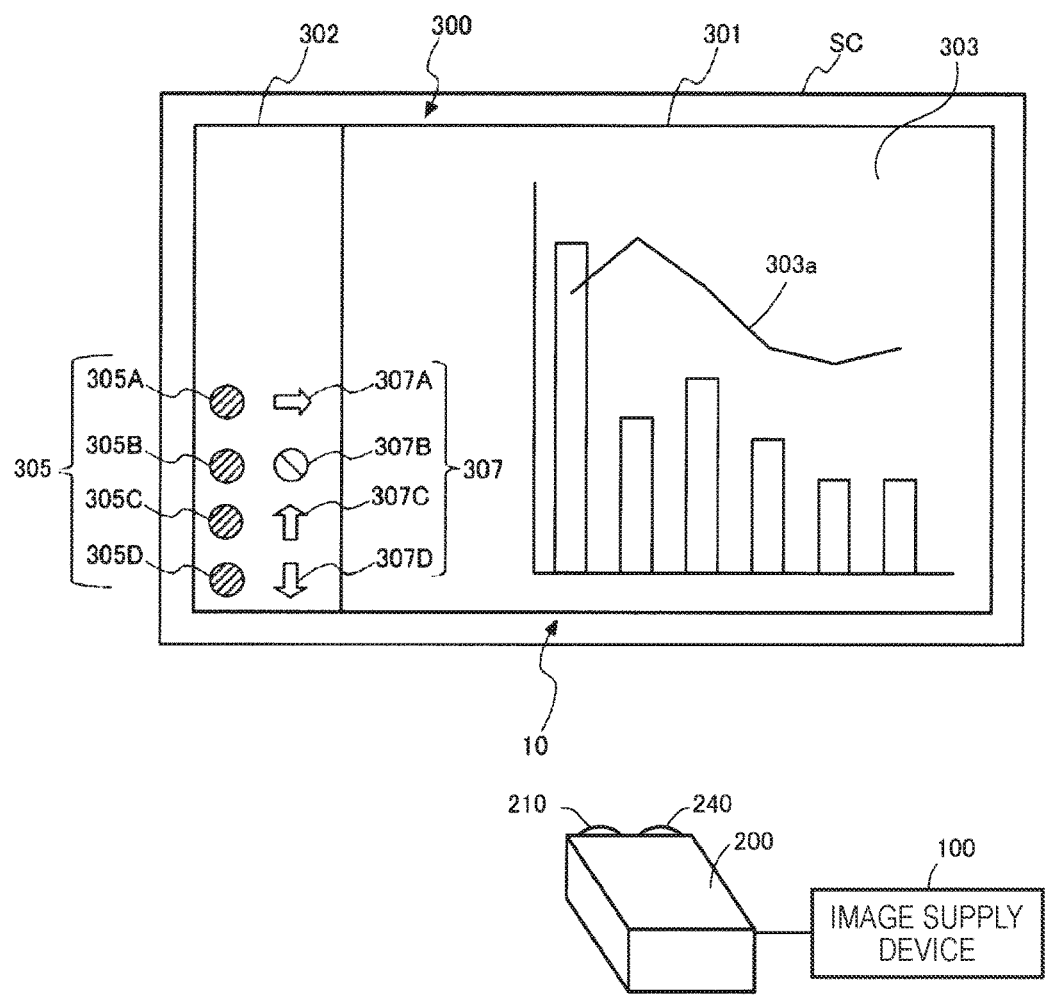
FIG. 6 is a diagram showing the projector according to the first embodiment.

Therefore, for example, when the first period elapses from when the projection image 300 becomes to have the configuration shown in FIG. 2, the projection image 300 turns to the configuration shown in FIG. 6.

According to the projector 200 and the method of controlling the projector 200 of the embodiment, the processes corresponding respectively to the operation detection markers 305 are not performed during the first period starting from when a change occurs in the first image 303. Therefore, it becomes possible to prevent the processes corresponding respectively to the operation detection markers 305 from being performed despite the intension of the user even if, for example, the user comes closer to the first image 303 on the screen SC immediately after the first image 303 changes.

MODIFIED EXAMPLES

The invention is not limited to the embodiment described above, but can variously be modified as described below, for example. Further, it is also possible to arbitrarily combine one or more modifications arbitrarily selected from the configurations of the modifications described below.

Modified Example 1

It is also possible for the projection section 210 to project the operation detection markers 305 on the screen SC during the first period starting from when a change occurs in the first image 303. However, in this case, there is a possibility that the following situation occurs. That is, even if the user operates the operation detection marker 305, the projector 200 fails to react to the operation. If such a situation occurs, there arises a possibility that the user is misled into thinking that the projector 200 is at fault.

Therefore, it is preferable for the operation detection markers 305 not to be projected (displayed) during the first period starting from when a change occurs in the first image 303 (during the period at which the processes corresponding to the operation detection markers 305 are not performed) as described in the present embodiment. In this case, it becomes possible to prevent the following situation from occurring. That is, even if the user operates the operation detection marker 305, the projector 200 fails to react to the operation.

It should be noted that it is also possible for the process execution control section 273 to control the display control section 271 to make the configuration of the operation detection markers 305 to be projected during the first period starting from when a change occurs in the first image 303 different from the configuration of the operation detection markers 305 to be projected in other periods. In this case, it becomes possible to notify the user of whether or not the operation detection markers 305 are available based on the configuration of the operation detection markers 305.

Modified Example 2

In the present embodiment, it is arranged that the process execution control section 273 starts stopping the execution of the processes corresponding to the operation detection markers 305 when the change detection section 274 detects a change in the first image 303. However, it is also possible to arrange that the imaging section 240 stops generating the taken image during the first period starting from when a change occurs in the first image 303 instead of the process execution control section 273 stopping the execution of the processes corresponding to the operation detection markers 305. For example, when the change detection section 274 has detected a change in the first image 303, the process execution control section 273 stops the operation of the imaging section 240, and when the timer 275 has measured the first period, the process execution control section 273 resumes the operation of the imaging section 240.

According to Modified Example 2, the taken image is not generated during the first period starting from when a change occurs in the first image 303, and therefore, the operation on the operation detection markers 305 is not detected. Therefore, it becomes possible to prevent the processes corresponding to the operation detection markers 305 from being performed despite the intention of the user during the first period starting from when a change occurs in the first image 303.

Modified Example 3

In the present embodiment, it is arranged that the process execution control section 273 starts stopping the execution of the processes corresponding to the operation detection markers 305 when the change detection section 274 detects a change in the first image 303. However, it is also possible to arrange that the operation detection section 272 stops detecting the selection operation during the first period starting from when a change occurs in the first image 303 instead of the process execution control section 273 stopping the execution of the processes corresponding to the operation detection markers 305. For example, when the change detection section 274 has detected a change in the first image 303, the process execution control section 273 stops the operation of the operation detection section 272, and when the timer 275 has measured the first period, the process execution control section 273 resumes the operation of the operation detection section 272.

According to Modified Example 3, the selection operation is not detected during the first period starting from when a change occurs in the first image 303, and therefore, it becomes possible to prevent the processes corresponding to the operation detection markers 305 from being performed despite the intention of the user.

Modified Example 4

The usage configuration of the projector 200 can be either one of the configuration of the front projection type for projecting the projection image from the front to the screen SC, and the configuration of the rear projection type for projecting the projection image to the back surface of the screen SC of a transmissive type.

Modified Example 5

Although in the embodiment described above, the operation detection markers 305 are used as the second image, it is also possible for the icons 307 to be used as the second image instead of the operation detection markers 305. In this case, the operation detection section 272 detects the operation on the icons 307 instead of the operation on the operation detection markers 305. Further, in the case in which the operation detection section 272 detects the operation on the icons 307, it is possible to omit the operation detection markers 305.

Modified Example 6

The image supply device 100 is, for example, a personal computer (PC), a tablet terminal, a smartphone, a video playback device, a DVD (digital versatile disc) player, a Blu-ray disc player, a television tuner system, a set-top box of CATV (cable television), or a video game device. It should be noted that the image supply device 100 is not limited to the equipment described above, but can arbitrarily be changed. The image supply device 100 can also be incorporated in the projector 200.

Modified Example 7

Although the liquid crystal light valves are used as the light modulation section 212, the light modulation section 212 is not limited to the liquid crystal light valves, but can arbitrarily be changed. For example, it is also possible for the light modulation section 212 to have a configuration using three reflective liquid crystal panels. Further, it is also possible for the light modulation section 212 to have a configuration such as a system using a single liquid crystal panel, a system using three digital mirror devices (DMD), or a system using a single digital mirror device. In the case of using just one liquid crystal panel or DMD as the light modulation section 212, the members corresponding to the color separation optical system and the color combining optical system are unnecessary. Further, besides the liquid crystal panel or the DMD, any configurations capable of modulating the light emitted by the light source can be adopted as the light modulation section.

Modified Example 8

Some or all of the elements realized by the control section 270 executing the control program can also be realized by hardware using an electronic circuit such as an FPGA (field programmable gate array) or an ASIC (application specific IC), or can also be realized by a cooperative operation of software and hardware.

What is claimed is:

1. A projector comprising:
a projection section adapted to project a first image and a second image on a projection surface;
an imaging section adapted to image the projection surface to generate a taken image; and
one or more processors programmed to
detect an operation on the second image based on the taken image, and
perform a process on at least one of the first and second images projected on the projection surface corresponding to the operation on the second image in response to the detection of the operation, wherein
the one or more processors are prevented from performing the process on the at least one of the first and second images during a first period starting from when a change occurs in the first image.

2. The projector according to claim 1, wherein
the one or more processors prevent the projection section from projecting the second image during the first period starting from when the change occurs in the first image.

3. The projector according to claim 1, wherein
the one or more processors are further programmed to change the first period in accordance with change information related to a change of the first period.

4. The projector according to claim 3, wherein
the change information relates to a second length of the first period selected by a user, and
the one or more processors change a first length of the first period to the second length selected by the user.

5. The projector according to claim 1, wherein
the imaging section is prevented from generating the taken image during the first period starting from when the change occurs in the first image.

6. The projector according to claim 1, wherein
the one or more processors are prevented from detecting the operation during the first period starting from when the change occurs in the first image.

7. The projector according to claim 1, wherein
the operation on the second image is an operation by a user to touch the second image.

8. The projector according to claim 1, wherein
the process is a positional manipulation of the first image.

9. The projector according to claim 1, wherein
the change that occurs in the first image is adding a visual element to the first image.

10. A method of controlling a projector adapted to project an image on a projection surface, comprising:
projecting a first image and a second image on the projection surface;
imaging the projection surface to generate a taken image;
detecting an operation on the second image based on the taken image; and
performing a process on at least one of the first and second images projected on the projection surface corresponding to the operation on the second image in response to the detection of the operation, wherein
the process on the at least one of the first and second images is prevented from being performed during a first period starting from when a change occurs in the first image in the performing the process.

11. The method according to claim 10, wherein
the operation on the second image is an operation by a user to touch the second image.

12. The method according to claim 10, wherein
the process is a positional manipulation of the first image.

13. The method according to claim 10, wherein
the change that occurs in the first image is adding a visual element to the first image.

14. The method according to claim 10, wherein
the first period is changed in accordance with change information related to a change of the first period,
the change information relates to a second length of the first period selected by a user, and
a first length of the first period is changed to the second length selected by the user.

* * * * *